(12) United States Patent
Park

(10) Patent No.: US 11,074,474 B2
(45) Date of Patent: Jul. 27, 2021

(54) APPARATUS FOR PERFORMING NEURAL NETWORK OPERATION AND METHOD OF OPERATING THE SAME

(71) Applicant: Samsung Electronics Co., Ltd., Suwon-si (KR)

(72) Inventor: Jun-seok Park, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 127 days.

(21) Appl. No.: 16/232,616

(22) Filed: Dec. 26, 2018

(65) Prior Publication Data

US 2019/0197350 A1    Jun. 27, 2019

(30) Foreign Application Priority Data

Dec. 26, 2017 (KR) .................. 10-2017-0180131

(51) Int. Cl.
*G06K 9/62* (2006.01)
*G06T 7/246* (2017.01)
*G06T 1/60* (2006.01)

(52) U.S. Cl.
CPC .......... *G06K 9/6215* (2013.01); *G06K 9/623* (2013.01); *G06T 1/60* (2013.01); *G06T 7/248* (2017.01); *G06T 2207/20084* (2013.01)

(58) Field of Classification Search
CPC ............. G06K 9/00744; G06K 9/4628; G06K 9/6215; G06K 9/623; G06T 1/60; G06T 2207/10028; G06T 2207/20084; G06T 2207/20224; G06T 2207/30248; G06T 7/248; G06T 7/254; G06T 7/73
See application file for complete search history.

(56) References Cited

U.S. PATENT DOCUMENTS

| 5,402,521 A | 3/1995 | Niida et al. |
| 5,845,048 A | 12/1998 | Masumoto |
| 9,159,137 B2 | 10/2015 | Huang et al. |
| 9,286,524 B1 | 3/2016 | Mei et al. |
| 9,661,351 B2 | 5/2017 | Laan |
| 2003/0233233 A1 | 12/2003 | Hong |

(Continued)

OTHER PUBLICATIONS

Ross Girshick, Fast R-CNN, Microsoft Research, arXiv: 1504.08083v2, Sep. 27, 2015.

*Primary Examiner* — Andrae S Allison
(74) *Attorney, Agent, or Firm* — Harness, Dickey & Pierce, P.L.C.

(57) ABSTRACT

A method of operating a neural network device configured to perform a neural network operation on successively input image frames includes generating, by a processing circuit, a second delta feature map by performing a linear operation on a first delta feature map generated based on a difference between a current image frame and a previous image frame; loading feature values as a second previous feature map onto the processing circuit from at least one memory, the loaded feature values being feature values corresponding to a first partial region to be updated in a first feature map stored in the at least one memory; generating, at the processing circuit, a second current feature map based on the second delta feature map and the second previous feature map; and updating the first feature map by storing the second current feature map in the at least one memory.

19 Claims, 15 Drawing Sheets

(56) References Cited

U.S. PATENT DOCUMENTS

| | | |
|---|---|---|
| 2011/0264614 A1 | 10/2011 | Gardner |
| 2015/0052092 A1 | 2/2015 | Tang et al. |
| 2017/0043166 A1 | 2/2017 | Choi et al. |
| 2017/0178346 A1 | 6/2017 | Ferro et al. |
| 2017/0213126 A1 | 7/2017 | Hammond et al. |
| 2017/0220894 A1* | 8/2017 | Kuzuya .............. G06K 9/00228 |
| 2018/0089555 A1 | 3/2018 | Park |

* cited by examiner

US 11,074,474 B2

APPARATUS FOR PERFORMING NEURAL NETWORK OPERATION AND METHOD OF OPERATING THE SAME

CROSS-REFERENCE TO RELATED APPLICATION

This application claims the benefit of Korean Patent Application No. 10-2017-0180131, filed on Dec. 26, 2017, in the Korean Intellectual Property Office, the disclosure of which is incorporated herein in its entirety by reference.

BACKGROUND

1. Field

At least one example embodiment of the inventive concepts relates to a semiconductor apparatus, and more particularly, to an apparatus for performing a neural network operation on successively received image frames, and a method of operating the same.

2. Related Art

A neural network refers to a computational architecture modeling a biological brain. Recently, as neural network technologies develop, studies are in active progress in which various kinds of electronic systems analyze input data by using a neural network device and extract valid information.

A neural network device requires a large amount of operations for complicated input data. To allow a neural network device to analyze in real-time successively input image frames and extract information, technology which may efficiently process a neural network operation is required.

SUMMARY

At least some example embodiments of the inventive concepts provide a neural network device which may increase a processing speed and reduce power consumption, and a method of operating the neural network device.

According to at least some example embodiments of the inventive concepts, a method of operating a neural network device configured to perform a neural network operation on successively input image frames includes generating, by a processing circuit, a second delta feature map by performing a linear operation on a first delta feature map generated based on a difference between a current image frame and a previous image frame; loading feature values as a second previous feature map onto the processing circuit from at least one memory, the loaded feature values being feature values corresponding to a first partial region to be updated in a first feature map stored in the at least one memory; generating, by the processing circuit, a second current feature map based on the second delta feature map and the second previous feature map; and updating the first feature map by storing the second current feature map in the at least one memory.

According to at least some example embodiments of the inventive concepts, a method of operating an application processor configured to perform a neural network operation includes generating, by a computing module, a linear delta feature map by performing a linear operation on a delta feature map generated based on a difference between a previous input frame and a current input frame; loading, from at least one of a first memory and a second memory, first feature values onto a processing circuit of the computing module, the first feature values being included in at least one first block, the at least one first block being a block, from among a plurality of blocks of a previous feature map stored in the at least one of the first memory and the second memory, that corresponds to valid blocks of the linear delta feature map; generating, by the computing module, a current feature map by summing each of delta feature values included in the valid blocks of the linear delta feature map and a corresponding feature value among the first feature values; and updating, by the computing module, the previous feature map based on the current feature map.

According to at least some example embodiments of the inventive concepts, a computing device configured to perform a neural network operation on successively received input frames includes a processing circuit configured to generate a second delta feature map by performing a linear operation on a first delta feature map generated based on a difference between a current image frame and a previous image frame, and generate a second current feature map based on a second previous feature map and the second delta feature map; and a memory configured to store the second previous feature map, wherein the computing device is configured to provide, to the processing circuit, feature values of a first partial region to be updated in the second previous feature map from the memory.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
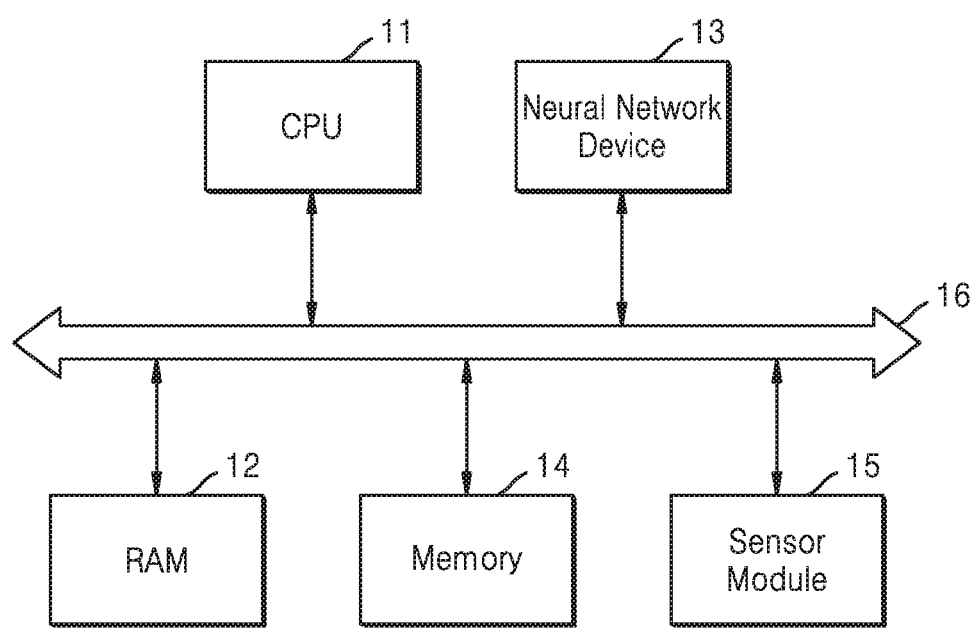
FIG. 1 is a block diagram of an electronic system according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of an electronic system 10 according to at least one example embodiment of the inventive concepts.

The electronic system 10 according to at least one example embodiment of the inventive concepts may analyze input data in real-time based on a neural network to extract valid information, and determine a situation or control elements of an electronic apparatus on which the electronic system 10 is mounted based on the extracted information. For example, the electronic system 10 is applicable to drones, advanced drivers assistance systems (ADASs), and apparatuses such as smart TVs, smartphones, medical apparatuses, mobile apparatuses, image display devices, measuring apparatuses, robot apparatuses, and Internet of Things (IoT). The electronic system 10 may be mounted on one of various kinds of electronic apparatuses. According to at least one example embodiment of the inventive concepts, the electronic system 10 of FIG. 1 may be an application processor. The electronic system 10 may be defined as including a neural network system in that it performs a neural network operation function.

Referring to FIG. 1, the electronic system 10 may include a central processing unit (CPU) 11, random access memory (RAM) 12, a neural network device 13, a memory 14, and a sensor module 15. The electronic system 10 may further include an input/output module, a security module, and a power controller, and also may further include various kinds of operation apparatuses. According to at least one example embodiment of the inventive concepts, all or some of the elements (the CPU 11, the RAM 12, the neural network device 13, the memory 14, and the sensor module 15) of the electronic system 10 may be mounted in one semiconductor chip. For example, the electronic system 10 may be implemented as a system on chip (SoC). The elements of the electronic system 10 may communicate with each other through a bus 16.

The CPU 11 controls an overall operation of the electronic system 10. The CPU 11 may include one processor core (single core), or include a plurality of processor cores (multi-core). The CPU 11 may process or execute programs and/or data stored in the memory 14. According to at least one example embodiment of the inventive concepts, the CPU 11 may control a function of the neural network device 13 by executing the programs stored in the memory 14.

The RAM 12 may store programs, data, or instructions temporarily. For example, the programs and/or data stored in the memory 14 may be temporarily stored in the RAM 12 under control of the CPU 11 or depending on a booting code. The RAM 12 may be implemented as a memory such as dynamic RAM (DRAM) or static RAM (SRAM).

The neural network device 13 may perform neural network operations, that is, operations of a provided neural network based on received input data, and generate an information signal based on a performance result (referred to as an operation result) of the neural network operation. The neural network device 13 may be denoted by a computing device, a computing module, etc.

The neural network may include various kinds of neural network models such as convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzman machine (RBM), fully convolutional network, long short-term memory (LSTM) network, classification network, but is not limited thereto. Also, a neural network configured to perform one task may include sub-neural networks implemented as the above-described neural network models. An example of a neural network structure is described with reference to FIG. 2.

Figure 2:
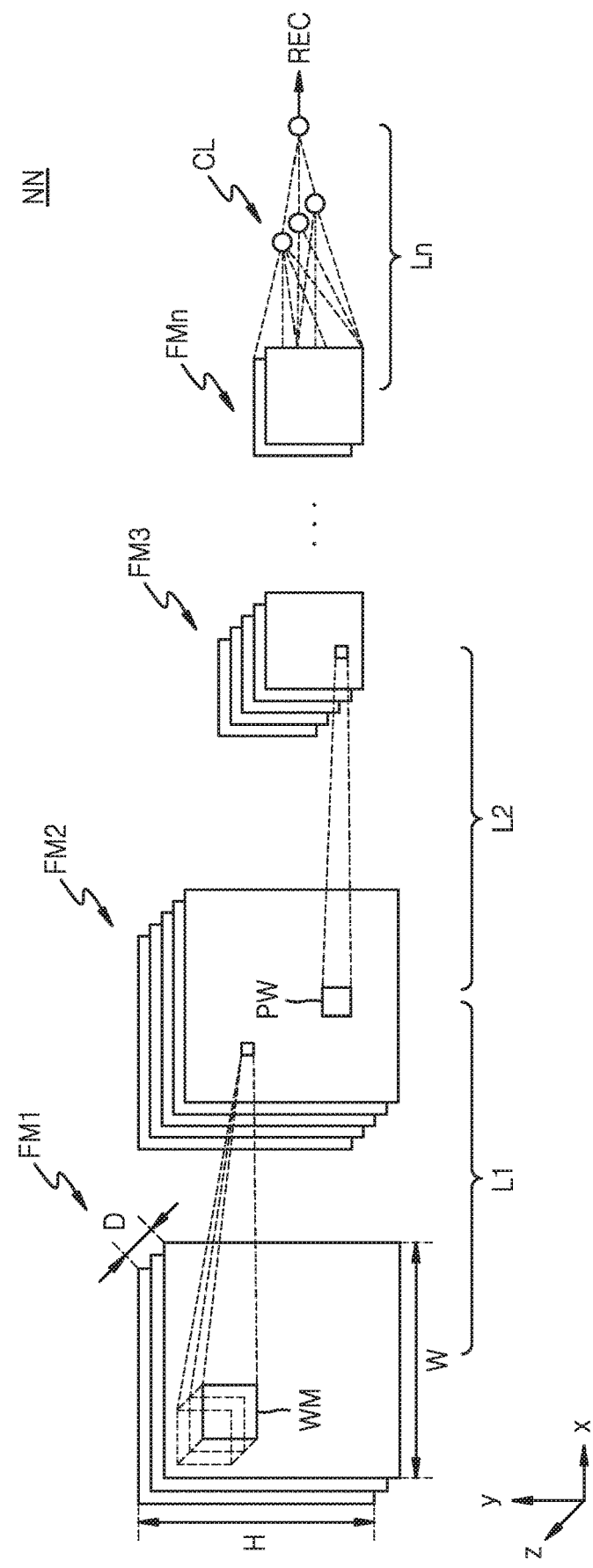
FIG. 2 is a view of an example of a neural network structure.

FIG. 2 illustrates a structure of a convolution neural network as an example of a neural network structure. Referring to FIG. 2, a neural network NN may include a plurality of layers L1 to Ln. Each of the plurality of layers L1 to Ln may be a linear layer or a non-linear layer. According to at least one example embodiment of the inventive concepts, at least one layer is coupled to at least one non-linear layer and they may be denoted by one layer. As an example, a linear layer may include a convolution layer, a fully connected layer, and a non-linear layer may include a pooling layer and an activation layer.

As an example, a first layer L1 may be a convolution layer, a second layer L2 may be a pooling layer, and an n-th layer may be a fully connected layer as an output layer. The neural network NN may further include an activation layer and further include a layer configured to perform a different kind of operation.

Each of the plurality of layers L1 to Ln may receive, as an input feature map, a feature map generated from an input image frame or a previous layer, and perform an operation on the input feature map to generate an output feature map or a recognition signal REC. In this case, the feature map denotes data in which various features of input data have been expressed. Feature maps FM1 to FMn may have, for example, a two-dimensional (2D) matrix or three-dimensional (3D) matrix (or referred to as a tensor) form. The feature maps FM1 to FMn have a width W (or referred to as a column), a height H (or referred to as a row), and a depth D. These may respectively correspond to an x-axis, a y-axis, and a z-axis on a coordinate system. In this case, the depth D may be denoted by the number of channels.

The first layer L1 may perform convolution on the first feature map FM1 and a weight map WM to generate a second feature map FM2. The weight map WM may filter the first feature map FM1 and may be denoted by a filter or a kernel. According to at least some example embodiments of the inventive concepts, a depth of the weight map WM, that is, the number of channels of the weight map WM is the same as a depth of the first feature map FM1, that is, the number of channels. Convolution may be performed on the same channels of the weight map WM and the first feature map FM1. The weight map WM is shifted in a crossing manner by using the first input feature map FM1 as a sliding window. A shifting amount may be denoted by a "stride length" or a "stride". During each shift, each weight included in the weight map WM may be multiplied by and added to all feature values of a region overlapping the first feature map FM1. As convolution is performed on the first feature map FM1 and the weight map WM, one channel of a second feature map FM2 may be generated. Though FIG. 2 illustrates one weight map WM, convolution may be performed on substantially a plurality of weight maps and the first feature map FM1, and a plurality of channels of the second feature map FM2 may be generated. In other words, the number of channels of the second feature map FM2 may correspond to the number of weight maps WM.

The second layer L2 may generate a third feature map FM3 by changing a spatial size of the second feature map FM2 through pooling. The pooling may be denoted by sampling or down-sampling. A 2D pooling window PW may be shifted on the second feature map FM2 on a size basis of the pooling window PW, and a desired value (e.g., a maximum or, alternatively, an average value of feature values) among feature values of a region overlapping the pooling window PW may be selected. Accordingly, a third feature map FM3 in which a spatial size has changed may be generated from the second feature map FM2. The number of channels of the third feature map FM3 is the same as the number of channels of the second feature map FM2.

The n-th layer Ln may combine features of the n-th feature map FMn to classify a class CL of input data. Also, the n-th layer may generate a recognition signal REC corresponding to the class. According to at least one example embodiment of the inventive concepts, input data may correspond to frame data included in a video stream, and the n-th layer may recognize an object and generate a recognition signal REC corresponding to the recognized object by extracting a class corresponding to the object included in an image represented by the frame data based on the n-th feature map FMn provided from a previous frame.

Referring to FIG. 1, input data received in the neural network device 13 may be a successively received image frame, and an information signal may be an image-based signal such as an object-recognition signal and an image-recognition signal. For example, the neural network device 13 may receive an image frame of a video stream, and generate a recognition signal regarding an object in an image represented by the image frame.

In a neural network system configured to recognize a situation based on a video stream, the neural network device 13 may receive successive image frames of similar forms to output nearly same neural network operation results. If an input of the neural network system is similar to an output, there is a high possibility that intermediate operation results (e.g. feature maps) generated during a neural network operation process are also similar. The neural network device 13 according to at least one example embodiment of the inventive concepts may reduce an operation amount and improve an operation processing speed by reusing intermediate operation results regarding a previous image frame when performing a neural network operation on a current image frame.

Meanwhile, the neural network device 13 may store, in an internal memory of the neural network device 13 or an external memory (e.g. the memory 14), at least one intermediate operation result (e.g. a feature map) regarding a previous image frame, and may access and update some values (e.g. some features of the feature map) which should be reused (that is, should be updated) or of which reuse is predicted, not the whole intermediate operation results, when reusing the intermediate operation results afterward.

According to at least one example embodiment of the inventive concepts, the neural network device 13 may store, in a memory having a relatively short distance from an operation circuit performing a neural network operation, for example, a processing unit, some values having a relatively high probability of being reused when performing a neural network operation on the next frame among intermediate operation results generated regarding a current frame, and store, in a memory having a relatively long distance from the operation circuit, the other values, for example, the values having a relatively low probability of being reused when performing a neural network operation on the next frame. In this case, the distance between the memory and the operation circuit denotes a physical or time distance. A relatively short distance between the memory and the operation circuit may mean that an access to the memory is relatively easy or time consumed for accessing the memory is relatively short when loading data stored in the memory onto the operation circuit, or storing data output from the operation circuit in the memory. According to at least one example embodiment of the inventive concepts, access latency of the memory having a relatively short distance from the processing unit may be shorter than access latency of the memory having a relatively long distance from the processing unit.

According to at least one example embodiment of the inventive concepts, the neural network device 13 may estimate an operation result regarding an image frame based on geometric characteristics between received image frames, and skip a neural network operation on at least a portion of the image frame based on the estimated operation result.

Accordingly, memory transaction and consumed time corresponding to the memory transaction may be reduced when the neural network device 13 stores intermediate operation results in the memory and reuses the intermediate operation results stored in the memory. A detailed method of operating the neural network device which may reduce the memory transaction and the consumed time corresponding to the memory transaction is described below.

The memory 14 is a location for storing data and may store an operation system (OS), various kinds of programs, and various kinds of data. According to at least one example embodiment of the inventive concepts, the memory 14 may store intermediate operation results generated while the neural network device 13 performs an operation. Also, the memory 14 may store various kinds of parameters used in the neural network device 13, for example, weight maps, bias maps, etc. In the case where the intermediate operation results are stored in the memory 14, access to the memory 14 may be frequently made and memory transaction may increase. However, in a method of operating the neural network device 13 according to at least one example embodiment of the inventive concepts, an increase in memory transactions may be prevented or alleviated.

The memory 14 may be DRAM and is not limited thereto. The memory 14 may include at least one of a volatile memory and a nonvolatile memory. The nonvolatile memory includes ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), and ferroelectric RAM (FeRAM). The volatile memory includes a DRAM, SRAM, and synchronous DRAM (SDRAM). According to at least one example embodiment of the inventive concepts, the memory 14 may include at least one of a hard disk drive (HDD), a solid state drive (SDD), a compact flash (CF) card, a secure digital (SD) card, a micro-SD card, a mini-SD card, an extreme digital (xD) card, and a memory stick.

The sensor module 15 may collect peripheral information of an electronic apparatus on which the electronic system 10 is mounted. The sensor module 15 may sense or receive an image signal from outside the electronic apparatus, and convert the sensed or received image signal to image data, that is, an image frame. For this, the sensor module 15 may include a sensing apparatus, that is, at least one of various kinds of sensing apparatuses such as a photographing apparatus, an image sensor, a light detection and ranging (LIDAR) sensor, an ultrasonic sensor, and an infrared sensor, or may receive a sensing signal from the above-mentioned apparatus.

The sensor module 15 may provide an image frame to the neural network device 13. For example, the sensor module 15 may include an image sensor, capture an external environment of the electronic apparatus to generate a video stream, and sequentially provide successive image frames of the video stream to the neural network device 13.

Figure 3:
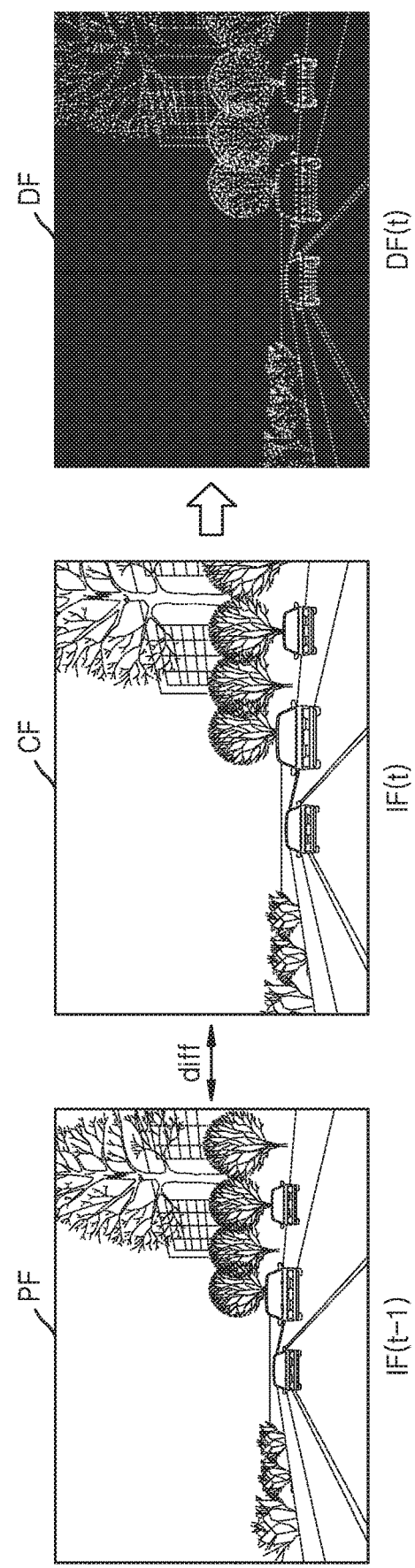
FIG. 3 is a view of image frames successively input to a neural network device according to at least one example embodiment of the inventive concepts and a difference between image frames.

FIG. 3 illustrates image frames successively input to a neural network device according to at least one example embodiment of the inventive concepts and a difference between image frames.

An image frame IF(t−1) input in advance is referred to as a previous image frame PF, and an image frame IF(t) input afterward is referred to as a current image frame CF. Referring to FIG. 3, a previous image frame PF and a current image frame CF successively input may have very similar images. A difference between the current image frame CF and the previous image frame PF may be denoted by a delta frame DF. According to at least some example embodiments of the inventive concepts, the previous frame and the current image frame are not limited to the examples illustrated in FIG. 3. For example, according to at least some example embodiments of the inventive concepts, the previous image frame and the current image frame are not necessarily two image frames that are temporally adjacent to each other, and, instead, the previous image frame and the current image frame can be spaced apart by a desired or, alternatively, predetermined number of image frames.

In the delta frame DF, a dark portion denotes pixels in which a difference between pixel values of the previous image frame PF and the current image frame CF is nothing or very small, and denotes delta pixels having a zero value or a value less than a threshold value, and a bright portion denotes pixels in which there is a difference between pixel values of the previous image frame PF and the current image frame CF, and denotes delta pixels having a non-zero value or a value of a threshold value or more. Delta pixels having a non-zero value or a value of a threshold value or more are referred to as valid pixels, and delta pixels having a zero value or a value less than a threshold value are referred to as invalid pixels. In the delta frame DF, most of delta pixels are invalid pixels, and the number of valid pixels may be very small. As described above, in the delta frame DF, the number of valid pixels may be relatively very less than the number of invalid pixels.

Figure 4:
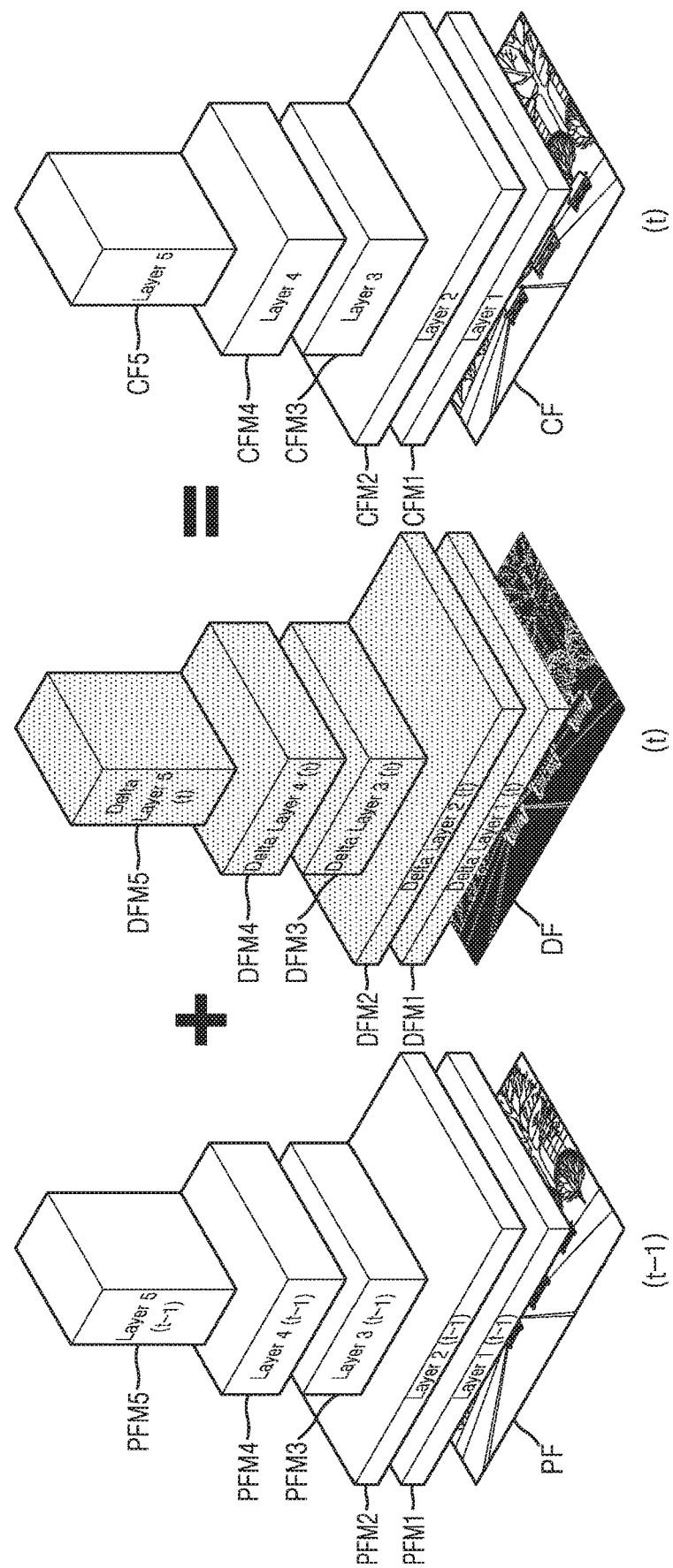
FIG. 4 is a view of an operation method of a neural network system including a neural network device according to at least one example embodiment of the inventive concepts.

FIG. 4 is a view of an operation method of a neural network system including a neural network device according to at least one example embodiment of the inventive concepts.

A neural network system according to at least one example embodiment of the inventive concepts may use intermediate operation results regarding a previous image frame when performing a neural network operation on a current image frame.

Referring to FIG. 4, previous feature maps PFM1 to PFM5 are intermediate operation results of the neural network operation performed on a previous image frame PF, and delta feature maps DFM1 to DFM5 are intermediate operation results of the neural network operation performed on a delta frame DF. In other words, operation results respectively performed on a first layer to a fifth layer at a previous time point (t−1) are output as previous feature maps PFM1 to PFM5, and operation results respectively performed on a first delta layer to a fifth delta layer at a current time point (t) are output as delta feature maps DFM1 to DFM5 of the current time point (t). Meanwhile, an operator and an operand (e.g. a bias, weight, etc.) of the first delta layer to the fifth delta layer may be the same as or similar to the first layer to the fifth layer. For example, an operator and an operand of the first delta layer may be the same as or similar to an operator and an operand of the first layer. However, the first delta layer may be different from the first layer in that an operation is performed on a delta frame instead of an input frame and in that previous feature maps PFM1 to PFM5 may be used during a process of performing an operation. The delta layer is described below with reference to FIGS. 5A and 5B.

Intermediate operation results of a neural network operation on a current image frame CF, for example, current feature maps CFM1 to CFM5, may be generated based on the previous feature maps PFM1 to PFM5 and the delta feature maps DFM1 to DFM5 without a neural network operation on the current image frame CF. For example, the first previous feature map PFM1 and the first delta feature map DFM1 may be summed to generate the first current feature map CFM1. As described above, since an operation is performed based on a data difference between the previous image frame PF and the current image frame CF, an operation method of the neural network system may be referred to as a delta network operation.

As described above with reference to FIG. 3, the number of valid pixels of the delta frame DF may be relatively very smaller than the number of invalid pixels. Since invalid pixels of the delta frame DF do not influence an operation result of a delta frame DF, an operation on the invalid pixels may be omitted. Therefore, since operations on delta features having a zero value are omitted in the delta feature maps DFM1 to DFM5, an amount of repeated operations on the previous feature maps PFM1 to PFM5 and the current feature maps CFM1 to CFM5 may be reduced. Therefore, an amount of operations on the delta frame DF may be very small compared with an amount of operations on a general image frame, for example, a previous image frame PF. Therefore, the neural network system may reduce an amount of operations compared with a case of performing a neural network operation on a current image frame CF by generating intermediate operation results regarding the current image frame CF based on intermediate operation results regarding the previous image frame PF and intermediate operation results regarding the delta frame DF. Therefore, a processing speed of the neural network device 13 (see FIG. 1), that is, a neural network operation speed, may be improved and power consumption may be reduced.

Figure 5A:
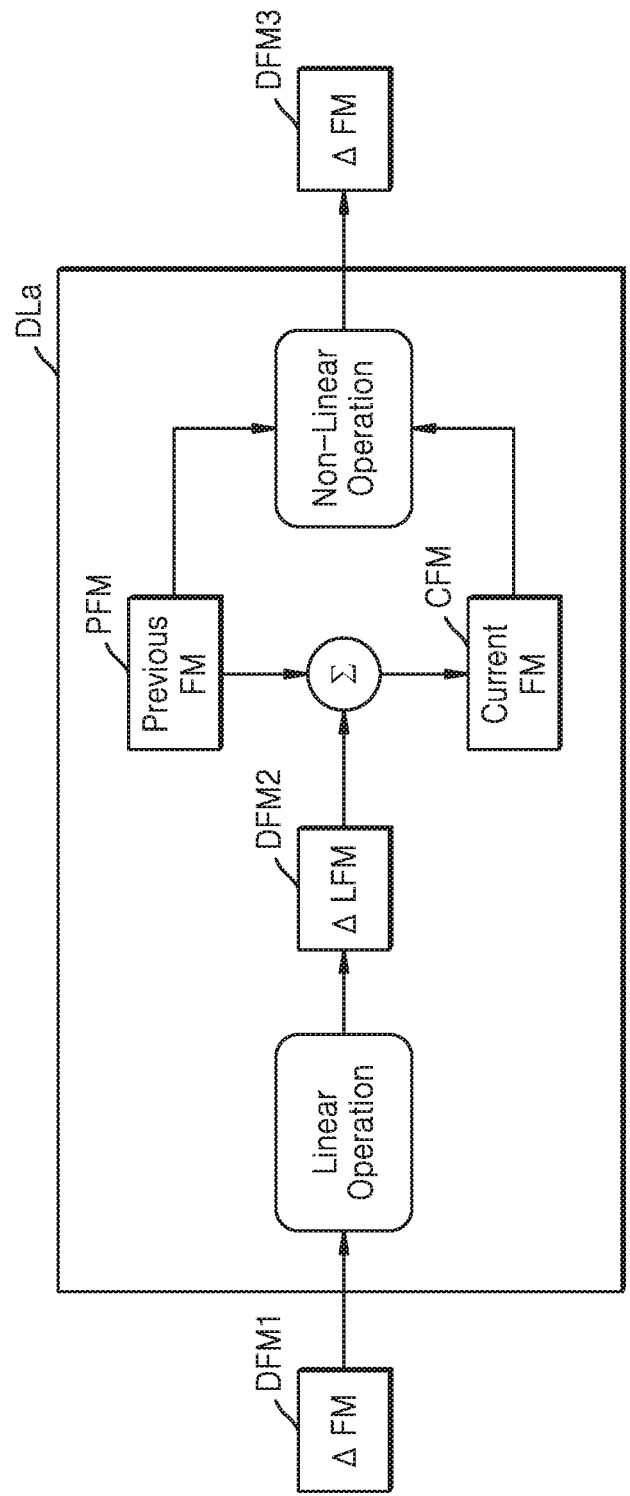
FIGS. 5A and 5B are block diagrams of a delta layer according to at least one example embodiment of the inventive concepts.
Figure 5B:
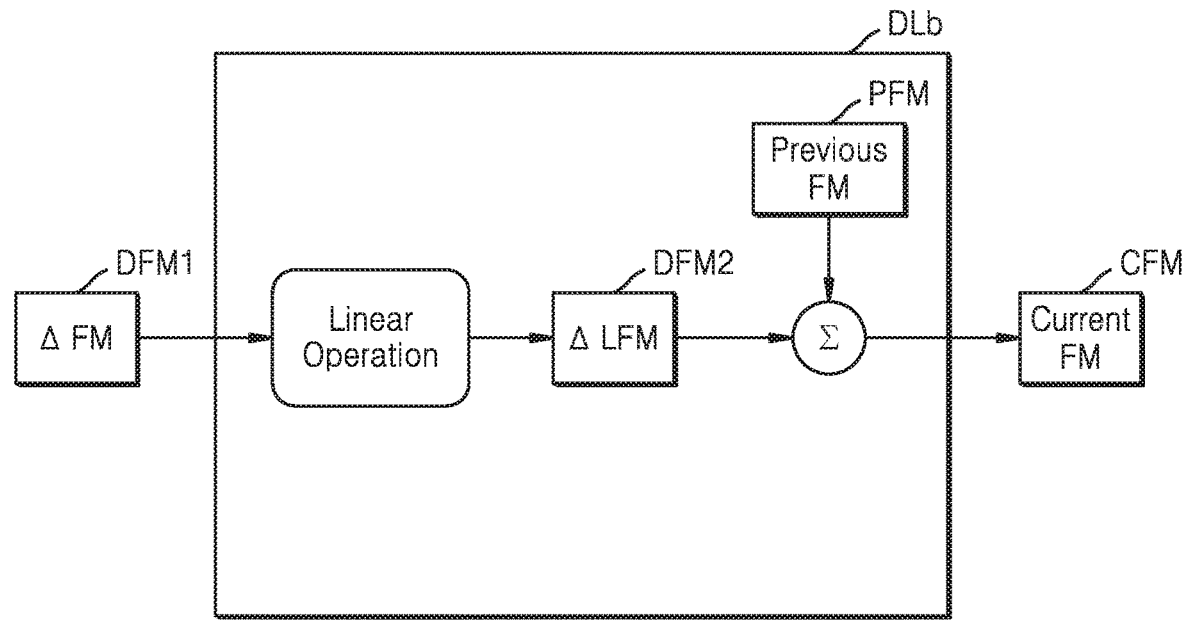

FIGS. 5A and 5B are examples of a delta layer according to at least one example embodiment of the inventive concepts. For example, at least one of the first delta layer to the fifth delta layer of FIG. 4 may be implemented by a delta layer structure of FIG. 5A or FIG. 5B.

Referring to FIG. 5A, a delta layer DLa may include a linear operation, addition, and a non-linear operation. For a non-limiting example, the linear operation may include convolution, arithmetic operation, and the like, and the non-linear operation may include pooling, active function operation, and the like. The linear operation and the addition may configure a linear layer, and the non-linear operation may configure a non-linear layer. A first delta feature map DFM1 may be input from a previous delta layer. The first delta feature map DFM1 is input data of the delta layer DLa. The first delta feature map DFM1 may be a delta feature map output from a previous layer, or may be a delta frame generated based on a previously input previous image frame and a currently input current image frame. The first delta feature map DFM1 includes delta features (or may be referred to as delta pixels) having a zero value, and delta features having a non-zero value. A linear operation may be performed on the first delta feature map DFM1 to generate a second delta feature map DFM2. The second delta feature map DFM2 may also be referred to a linear feature map (LFM) or a linear delta feature map (ΔLFM). A feature map resulting from performing a linear operation on a delta feature map may also be referred to, in the present disclosure, as a linear delta feature map.

Meanwhile, a non-linear operation cannot be performed on a difference between a previous image frame and a current image frame, that is, a delta feature map. To perform the non-linear operation, a previous feature map PFM and a current feature map CFM are required. The second delta feature map DFM2 may be added to the previous feature map PFM to generate the current feature map CFM. The non-linear operation may be performed on the previous feature map PFM and the current feature map CFM, and a third delta feature map DFM3 may be generated based on a result of performing the non-linear operation. For example, a difference between a result of performing the non-linear operation on the previous feature map PFM and a result of performing the non-linear operation on the current feature map CFM may be generated as the third delta feature map DFM3. The third delta feature map DFM3 may be provided as input data of the next delta layer.

Although FIG. 5A illustrates that the delta layer DLa includes the linear operation and the non-linear operation, the delta layer DLa is not limited thereto. According to at least one example embodiment of the inventive concepts, as illustrated in FIG. 5B, the delta layer DLb may include only the linear operation. The previous feature map PFM is added to the second delta feature map DFM2 generated by the linear operation to generate the current feature map CFM, and the current feature map CFM may be output.

As described above with reference to FIGS. 5A and 5B, the delta layer requires the previous feature map PFM to generate the current feature map CFM. The current feature map CFM may be provided as a previous feature map PFM during an operation on the next image frame. Therefore, a process of updating the previous feature map PFM is required. In this case, since the previous feature map PFM is stored in the memory and used, an additional memory bandwidth may be required to read the previous feature map PFM from the memory, and also, store a generated current feature map CFM in the memory.

However, the neural network device according to at least one example embodiment of the inventive concepts which will be described below may read only features to be updated from a previous feature map in reusing a feature map stored in the memory, for example, a previous feature map, or store features having a high possibility of being updated when performing a neural network operation on the next image frame among features of a current feature map in an internal buffer or a memory having a relatively short distance from an operation circuit, or estimate a neural network operation result and skip performing of an operation when a change of the operation result is small based on the estimated operation result. Therefore, memory transaction and consumed time corresponding to the memory transaction may be reduced, and the neural network device may efficiently perform the neural network operation without an increase of an additional memory bandwidth.

Figure 6:
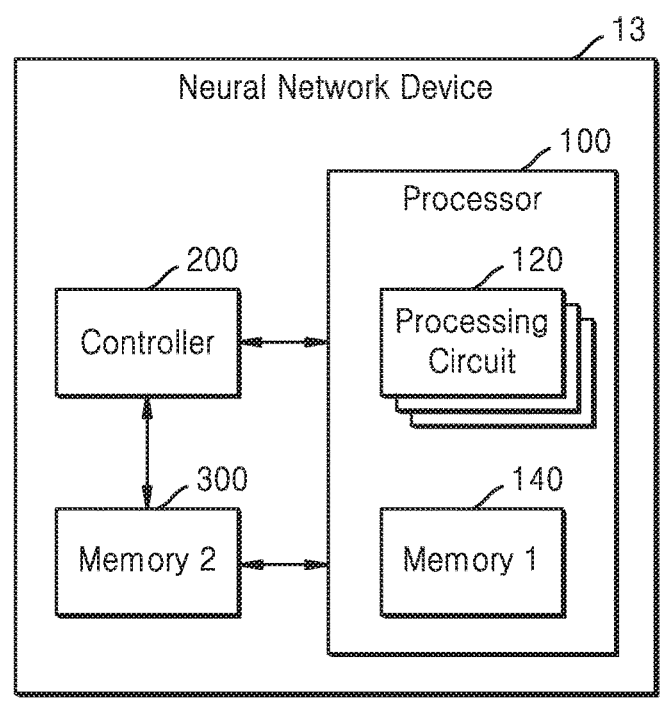
FIG. 6 is a block diagram of a neural network device according to at least one example embodiment of the inventive concepts.

FIG. 6 is a block diagram of a neural network device 13 according to at least one example embodiment of the inventive concepts.

Referring to FIG. 6, the neural network device 13 may include a processor 100, a controller 200, and a memory 300. Also, the processor 100 may include a plurality of processing circuits 120 and a memory 140. In addition, the neural network device 13 may further include a direct memory access (DMA) controller to store data in an external memory. Although FIG. 6 illustrates that the neural network device 13 includes one processor 100, the neural network device 13 is not limited thereto and may include a plurality of processors 100. The processor 100 may be implemented by using hardware circuits.

According to at least one example embodiment of the inventive concepts, the neural network device 13 may be implemented by using one semiconductor chip, for example, an SoC. However, the neural network device 13 is not limited thereto and may be implemented by using a plurality of semiconductor chips. For convenience of description, the memory 140 provided inside the processor 100 is denoted by a first memory 140, and the memory 300 provided outside the processor 100 is denoted by a second memory 300.

The controller 200 may be implemented by using a CPU, a microprocessor, etc. and may control an overall operation of the neural network device 13. The controller 200 may set and manage neural network operation parameters such that the processor 100 normally computes an operation of layers of the neural network. Also, the controller 200 may control the neural network device 13 such that the plurality of processing circuits 120 efficiently operate based on management policies regarding the neural network device 13, and control input/output of data between inner/outer elements of the processor 100, an operation flow, etc.

For example, the controller 200 may determine a partial region to be updated in a feature map stored in the first memory 140 or the second memory 300, that is, a previous feature map, and load feature values of the partial region to be updated onto the processing circuit 120 which will perform an operation among the plurality of processing circuits 120 based on the feature map.

According to at least one example embodiment of the inventive concepts, the controller 200 may analyze successively received image frames to analyze a geometric characteristic of an object included in an image, for example, a geometric movement. The controller 200 may determine a partial region having a high probability of being updated in a feature map based on the geometric characteristic. For example, the controller 200 may estimate a partial region to be updated when performing a neural network operation on the next frame in the feature map based on a previous image frame and a current image frame, and store feature values of the partial region in a memory having a relatively short distance from the plurality of processing circuits 120, for example, the first memory 140. The controller 200 may calculate a conversion function based on a geometric movement, and estimate an operation result regarding the current image frame by converting an operation result regarding the previous image frame based on the calculated conversion function.

According to at least one example embodiment of the inventive concepts, an algorithm related to an operation of the controller 200 may be implemented by using software or firmware, stored in a memory (e.g. the second memory 300), and executed by the above-described CPU, microprocessor, etc.

The plurality of processing circuits 120 may perform an allocated operation under control of the controller 200. The plurality of processing circuits 120 may be implemented to simultaneously operate in parallel. Furthermore, each of the plurality of processing circuits 120 may operate independently. For example, each of the plurality of processing circuits 120 may be implemented as a core circuit which may execute instructions. The processing circuit 120 may perform a neural network operation according to an operation method of the neural network system according to at least one example embodiment of the inventive concepts described with reference to FIG. 4.

The first memory 140 is an internal memory of the processor 100 and may be, for example, SRAM. However, the first memory 140 is not limited thereto and may be implemented by using a simple buffer of the processor 100, a cache memory, or a different kind of memory such as DRAM. The first memory 140 may store data generated by an operation performed by the plurality of processing circuits 120, for example, feature maps, or various kinds of data generated during an operation process, etc. The first memory 140 may be a shared memory of the plurality of processing circuits 120.

The second memory 300 may be implemented by using RAM, for example, DRAM or SRAM. However, the second memory 300 is not limited thereto and may be implemented by using a non-volatile memory. The second memory 300 may be accessed by a host processor (e.g. the CPU 110 of FIG. 1) or other external apparatuses. According to at least one example embodiment of the inventive concepts, a capacity of the second memory 300 may be relatively larger than a capacity of the first memory 140. According to at least one example embodiment of the inventive concepts, access latency of the first memory 140 may be relatively shorter than access latency of the second memory 300.

Figure 7:
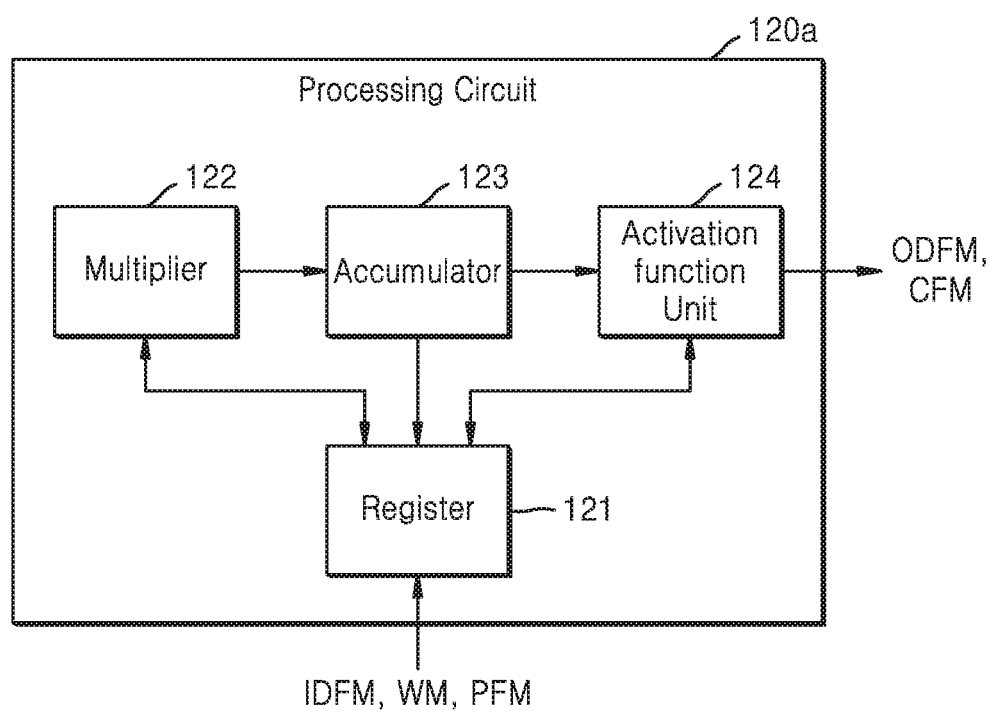
FIG. 7 is a block diagram of a processing circuit according to at least one example embodiment of the inventive concepts.

FIG. 7 is a block diagram of an example of a processing circuit 120a according to at least one example embodiment of the inventive concepts.

Referring to FIG. 7, the processing circuit 120a includes a register 121, a multiplier array 122, an accumulator array 123, and an activation function unit 124. In addition, the processing circuit 120a may further include other elements, for example, an adder, an arithmetic logic operation circuit, etc.

Various data required for an operation, for example, an input delta feature map IDFM, a weight map WM, and a previous feature map PFM may be loaded on the register 121. The weight map WM and the previous feature map PFM may be loaded from a memory, for example, the first memory 140 or the second memory 300 of FIG. 5. The multiplier array 122, the accumulator array 123, and the activation function unit 124 may perform a linear operation or a non-linear operation. As an operation result, an output delta feature map ODFM and a current feature map CFM may be generated, and the current feature map CFM is stored in the memory and so a feature map, that is, the previous feature map PFM, may be updated. The output delta feature map ODFM may be loaded on the register 121 or a register of another processing circuit, or stored in the memory.

Figure 8:
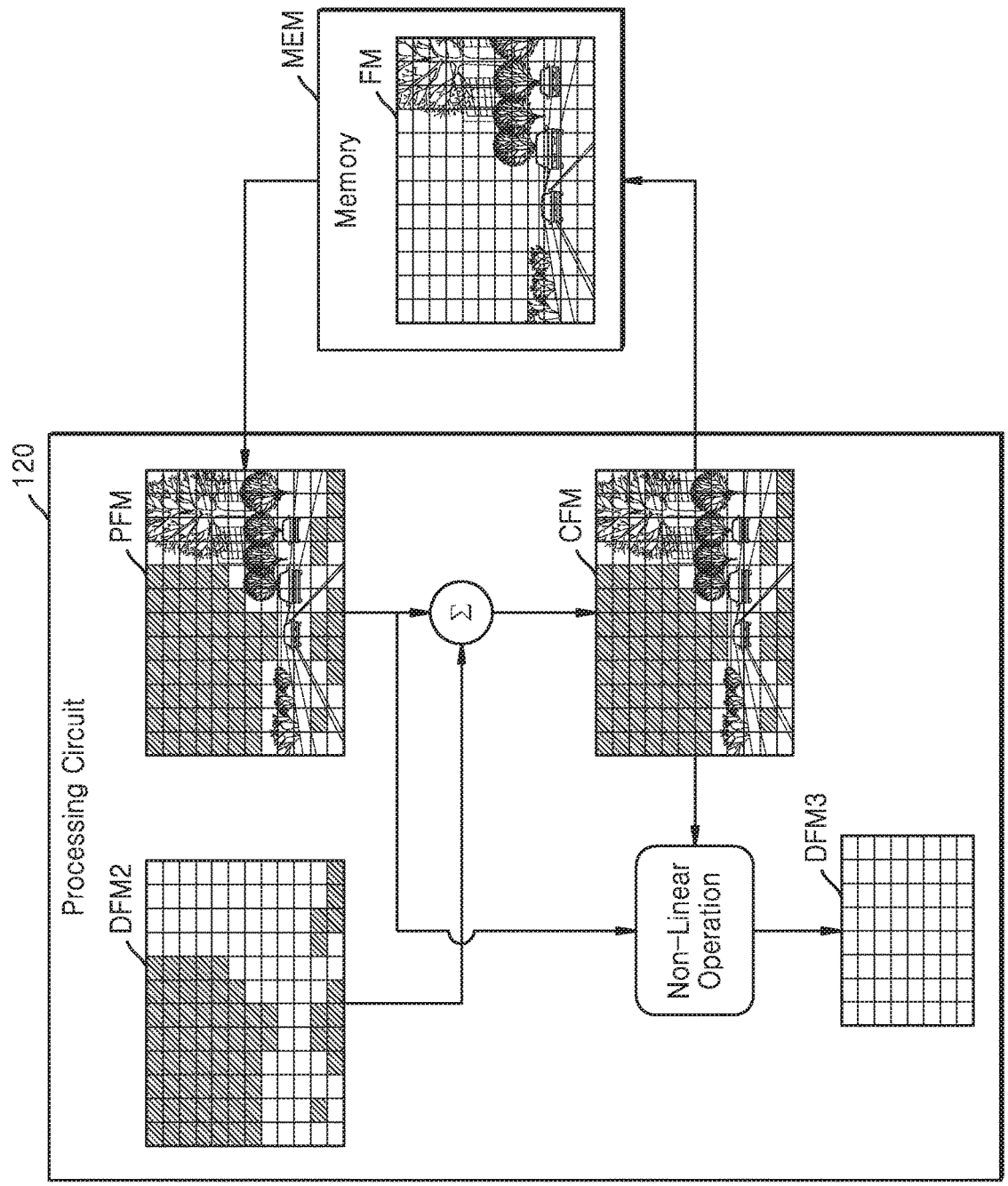
FIG. 8 is a view for explaining a method of operating a neural network device, according to at least one example embodiment of the inventive concepts.

FIG. 8 is a view for explaining a method of operating a neural network device, according to at least one example embodiment of the inventive concepts. The operating method of FIG. 8 illustrates a method of accessing a memory during a process in which the neural network device according to at least one example embodiment of the inventive concepts performs at least one delta layer operation. Description is made assuming that the processing circuit 120 performs the linear operation and the non-linear operation described with reference to FIG. 5A.

Referring to FIGS. 5A and 8, the processing circuit 120 may perform a linear operation to generate a second delta feature map DFM2. After that, to perform a non-linear operation, the processing circuit 120 should generate a current feature map CFM, and for this, the processing circuit 120 should load a previous feature map PFM. For example, the previous feature map PFM may be loaded on the register 121 (see FIG. 6). In this case, a memory MEM may be at least one of the first memory 140 (see FIG. 6), the second memory 300 (see FIG. 6), and an external memory (e.g. the external memory 14 of FIG. 1) of the neural network device 13. The processing circuit 120 may generate a current feature map CFM by summing the previous feature map PFM and the second delta feature map DFM2, and after that, generate a third delta feature map DFM3 by performing a non-linear operation on the current feature map CFM and the previous feature map PFM.

Meanwhile, a delta feature having a zero value in the second delta feature map DFM2 cannot influence an operation result, that is, the third delta feature map DFM3 and the current feature map CFM. Therefore, the neural network device according to at least one example embodiment of the inventive concepts may determine a partial region to be updated in the feature map FM based on delta feature values of the second delta feature map DFM2, and load feature values corresponding to the partial region to be updated, as the previous feature map PFM, from the memory MEM.

According to at least one example embodiment of the inventive concepts, the neural network device may determine, as a partial region to be updated, a partial region on the feature map FM corresponding to a location of delta features having delta feature values of a threshold value or more in the second delta feature map DFM2.

According to at least one example embodiment of the inventive concepts, as illustrated in FIG. 8, delta feature maps (e.g. the second delta feature map DFM2 and the third delta feature map DFM3) and feature maps (e.g. the current feature map CFM and the previous feature map PFM) may be classified into a plurality of blocks having a matrix form, and data, that is, delta feature values or feature values may be managed on a block basis. Although FIG. 8 illustrates that the second delta feature map DFM2 and the feature maps PFM, FM, and CFM include the same number of blocks, they are not limited thereto and the number of blocks may be determined by an access unit, etc. of the memory MEM.

Figure 9:
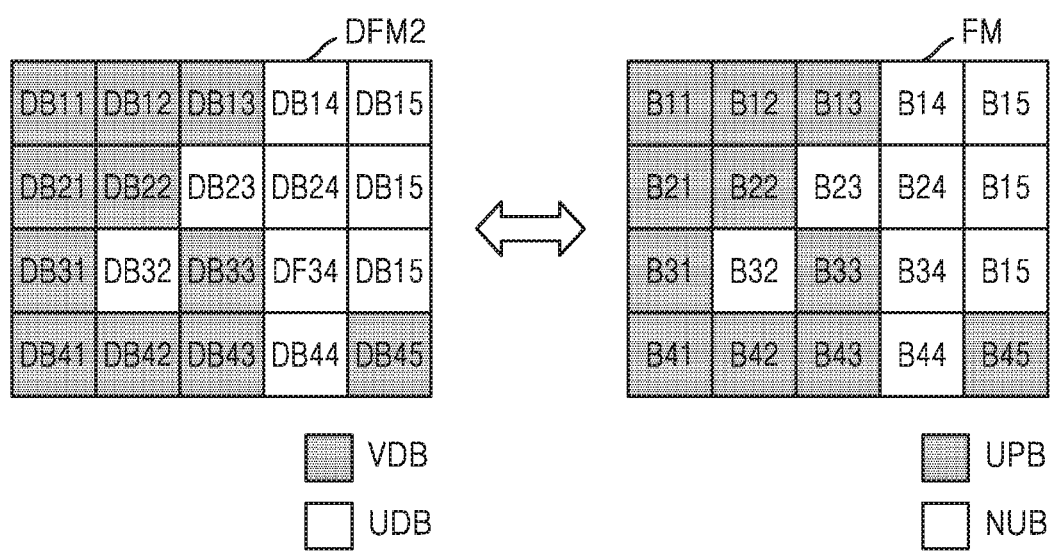
FIG. 9 is a view illustrating an example in which delta feature values and feature values are managed on a block basis according to at least one example embodiment of the inventive concepts.

FIG. 9 is a view illustrating an example in which delta feature values and feature values are managed on a block basis. Referring to FIG. 9, according to at least one example embodiment of the inventive concepts, the second delta feature map DFM2 and the feature map FM may include twenty blocks.

According to at least one example embodiment of the inventive concepts, the neural network device may determine, as a valid delta block VDB, a block including delta feature values having a threshold value or more, that is, at least one or a reference number of valid delta features in the second delta feature map DFM2, and determine, as an invalid delta block UDB, a block not including a valid delta feature or a block including less than the reference number of valid delta features. The neural network device may determine, as a block UPB to be updated, blocks corresponding to valid delta blocks VDB on the feature map FM, for example, blocks at the same location as that of the valid delta blocks VDB, and determine, as a block NUB not to be updated, the rest of the blocks. The neural network device may load feature values of the block UPB to be updated onto the processing circuit 120 from the memory MEM.

Referring to FIG. 8, a dark portion of the second delta feature map DFM2 represents invalid delta blocks UDB, and a bright portion represents valid delta blocks VDB. As illustrated, feature values of blocks corresponding to valid delta blocks VDB in the feature map FM stored in the memory MEM may be loaded as a previous feature map PFM. Delta feature values of the second delta feature map DFM2 and corresponding feature values of the previous feature map PFM are summed to generate a current feature map CFM. Blocks at the same location as that of the previous feature map PFM (or valid blocks of the second delta feature map DFM2) on the current feature map CFM may include valid feature values. Therefore, the valid feature values included in the blocks are stored in the memory MEM, and so the feature map FM stored in the memory MEM may be updated.

As described above, the neural network device according to at least one example embodiment of the inventive concepts may reduce memory transactions by selectively loading only feature values of a region to be updated in the feature map FM stored in the memory MEM, and storing updated feature values in the memory MEM again.

Figure 10:
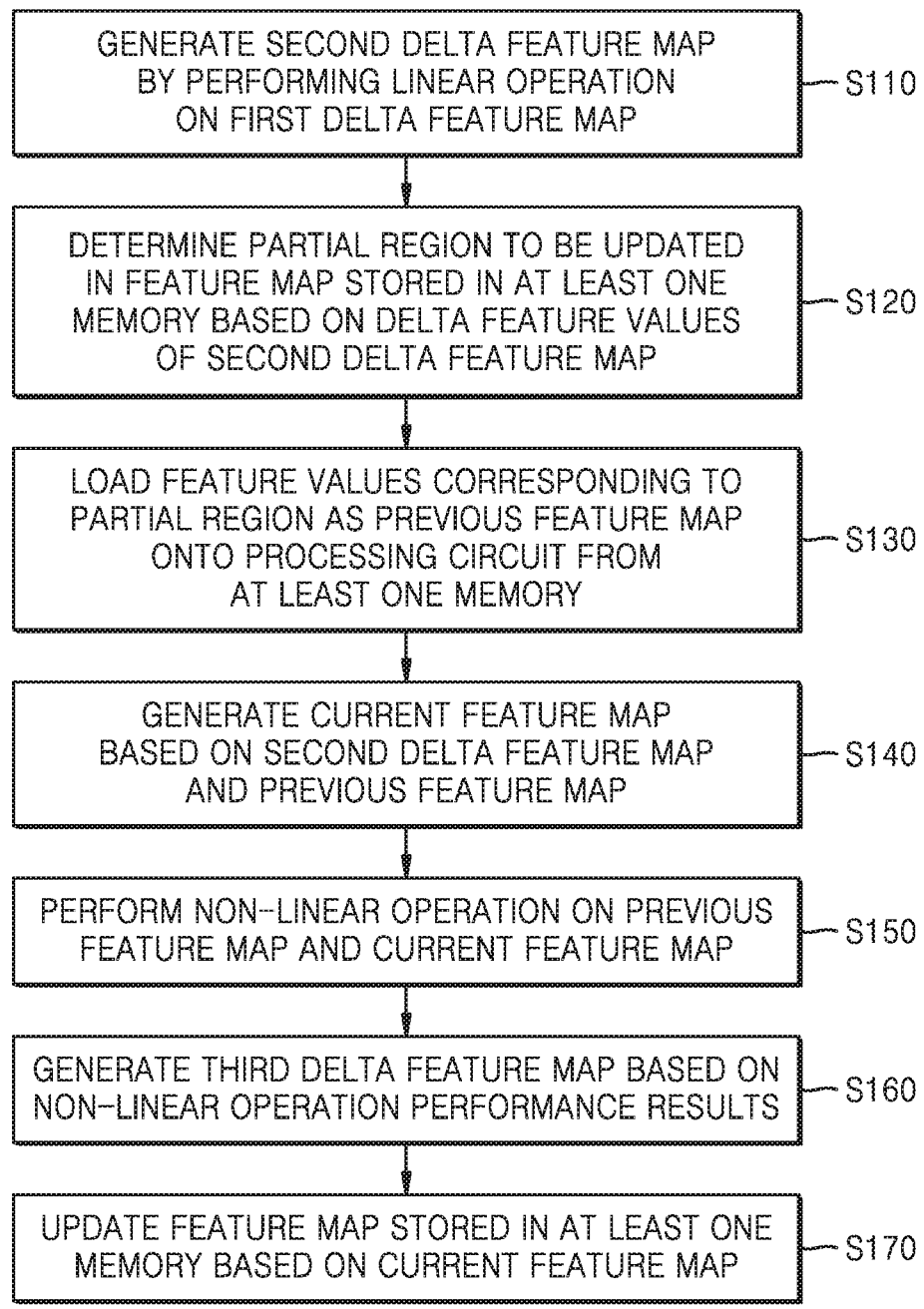
FIG. 10 is a flowchart of a method of operating a neural network device, according to at least one example embodiment of the inventive concepts to which content described with reference to FIG. 8 is applicable.

FIG. 10 is a flowchart of a method of operating a neural network device, according to at least one example embodiment of the inventive concepts. The operating method of FIG. 10 illustrates a delta layer operation method and a memory access method of the neural network device according to at least one example embodiment of the inventive concepts. According to at least some example embodiments of the inventive concepts, the content described with reference to FIG. 8 is applicable to the operating method illustrated in FIG. 10.

Referring to FIG. 10, the neural network device may generate a second delta feature map by performing a linear operation on an input first delta feature map (S110). For example, a processing circuit provided to the neural network device may generate the second delta feature map by performing a linear operation on the first delta feature map.

After that, the neural network device may determine a partial region to be updated in a feature map stored in at least one memory based on delta feature values of the second delta feature map (S120). The feature map, that is, a previous feature map, which is an intermediate operation result of a previously performed neural network operation, may be stored in the at least one memory. The feature map may be stored in one memory, or distributed to two or more memories and stored therein. Meanwhile, as described with reference to FIGS. 8 and 9, a partial region to be updated may be determined on a block basis including a plurality of features. However, it is not limited thereto and the partial region to be updated may be determined on a feature basis.

The neural network device may load feature values corresponding to the partial region to be updated onto the processing circuit from at least one memory (S130). Feature values may be loaded as a previous feature map. As an example, feature values may be loaded onto a buffer or a register inside the processing circuit.

The neural network device may generate a current feature map based on the second delta feature map and the previous feature maps (S140). For example, the processing circuit may generate the current feature map by summing delta feature values of the second delta feature map and corresponding values among feature values of the loaded previous feature maps. Also, the processing circuit may perform a non-linear operation on the previous feature map and the current feature map (S150), and generate a third delta feature map based on results of the non-linear operation performance (S160). A difference between the result of the non-linear operation performed on the previous feature map and the result of the non-linear operation performed on the current feature map may be generated as the third delta feature map.

The neural network device may update a feature map stored in at least one memory based on the current feature map (S170). The current feature map is stored in the memory and so the feature map may be updated. The current feature map stored in the memory may be provided as a previous feature map when an operation is performed on the next frame. A third feature map may be provided as an input for the next delta layer. A linear operation may be performed on the third delta feature map in the next delta layer.

Figure 11:
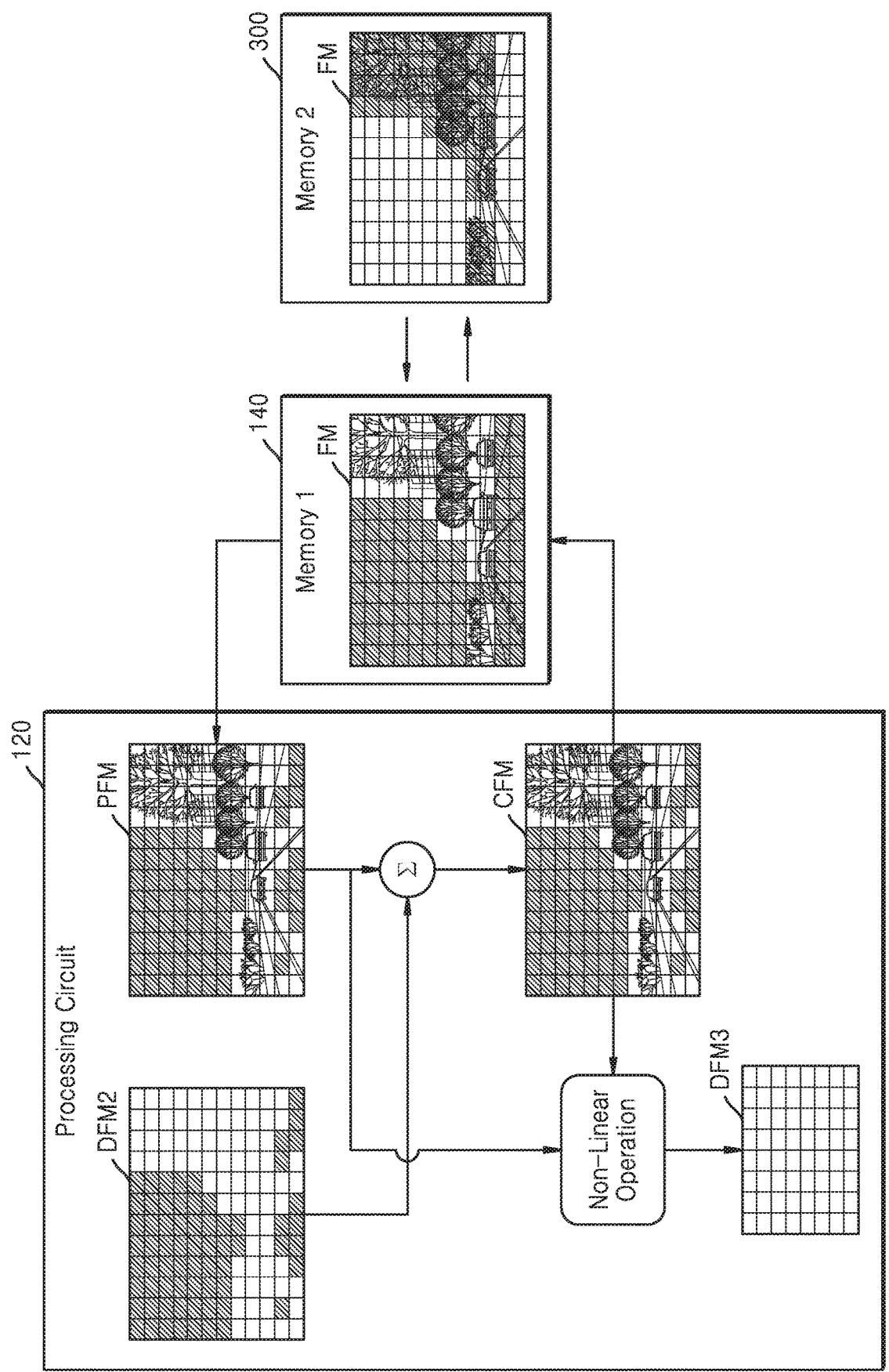
FIG. 11 is a view for explaining a method of operating a neural network device, according to at least one example embodiment of the inventive concepts.

FIG. 11 is a view for explaining a method of operating a neural network device according to at least one example embodiment of the inventive concepts. The operating method of FIG. 11 illustrates a method in which the neural network device according to at least one example embodiment of the inventive concepts stores, in a memory, a current feature map CFM generated during a process of performing at least one delta layer operation.

According to at least one example embodiment of the inventive concepts, the neural network device may predict a partial region to be updated by determining the partial region having a high probability of being updated when performing an operation on the next image frame in the current feature map CFM. For example, the neural network device may predict, as the partial region to be updated when performing an operation on the next image frame, the partial region having a relatively high probability of being updated, or having a preset reference probability or more. The neural network device may predict a partial region to be updated before generating the current feature map CFM, and when the current feature map CFM is generated, store the partial region to be updated in the current feature map CFM, that is, the update-predicted partial region, in a memory having a relatively short distance from the processing circuit 120, for example, the first memory 140, and store the rest of the regions in a memory having a relatively long distance from the processing circuit 120, for example, the second memory 300, based on predicted results. Hereinafter, for convenience of description, as illustrated in FIG. 11, description is made assuming that the update-predicted partial region is stored in the first memory 140, and the rest of the regions are stored in the second memory 300. However, it is not limited thereto, and a memory in which the update-predicted partial region will be stored, and another memory in which the rest of regions will be stored may be determined depending on a hierarchy of memories provided to the neural network device and/or an electronic apparatus to which the neural network device is mounted.

In FIG. 11, blocks corresponding to objects such as an automobile, a tree, and a building having lots of windows among blocks of the current feature map CFM may have a high probability of being updated in the next image frame. On the contrary, blocks corresponding to a background such as the sky and the ground may have a low probability of being updated in the next image frame. Accordingly, the blocks corresponding to the objects may be stored in the first memory 140, and the blocks corresponding to the background may be stored in the second memory 300.

Meanwhile, blocks currently stored in the first memory 140 or the second memory 300, and included in an update-predicted partial region among blocks not used when the current feature map CFM is generated among blocks of the feature blocks FM, may be also stored in the first memory 140, and blocks not included in the update-predicted partial region may be stored in the second memory 300. For example, a block which has been stored in the first memory 140 may be stored in the second memory 300, or a block which has been stored in the second memory 300 may be stored in the first memory 140 based on predicted results.

The neural network device may load a previous feature map PFM from the first memory 140 and the second memory 300 when performing an operation on the next image frame. However, the number of blocks loaded from the first memory 140 may be relatively large.

Meanwhile, both the first memory 140 and the second memory 300 are internal memories of the neural network device and are not limited thereto. An update-predicted partial region may be stored in an internal memory, and the rest of regions may be stored in an external memory. Alternatively, both the two regions may be stored in the external memory. However, as described above, the memory in which the update-predicted partial region is stored may have a relatively short distance from the processing circuit 120 compared with the memory in which the rest of regions are stored.

A method of predicting a partial region to be updated is described with reference to FIGS. 12A and 12B.

Figure 12A:
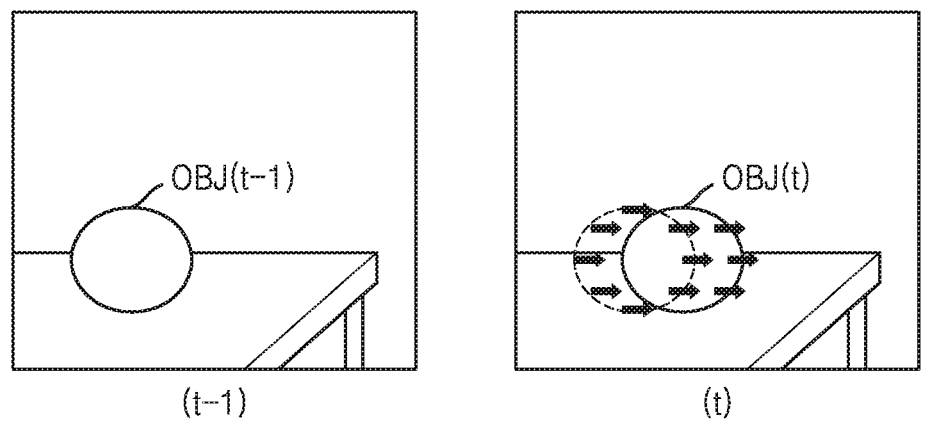
FIGS. 12A and 12B are views of successive image frames.
Figure 12B:
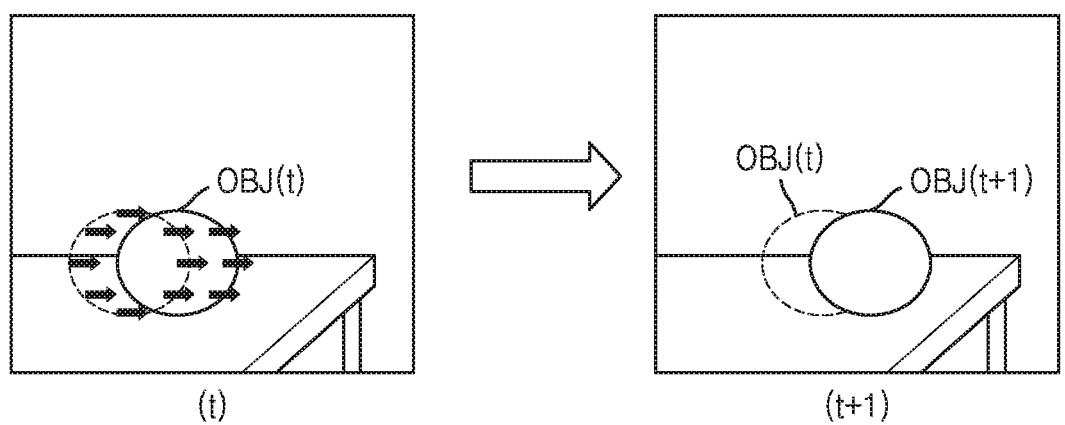

FIGS. 12A and 12B illustrate successive image frames.

Referring to FIG. 12A, an image frame at a previous time point (t−1), that is, a previous image frame, and an image frame at a current time point (t), that is, a current image frame, include the same object OBJ, and the object OBJ may change its location on the image frames. That is, the object OBJ may move. The neural network device may track a movement of the object OBJ on the image based on various image processing methods, for example, vision processing, an optical flow, a movement estimation method, etc. Therefore, the neural network device may derive a geometric movement of the object on the image.

Referring to FIG. 12B, the neural network device may estimate a location of the object OBJ (t+1) on an image frame at the next time point (t+1), that is, on the next image frame based on the geometric movement of the object.

The neural network device may determine a region having a high probability of being updated in the next image frame based on the estimated location. According to at least one example embodiment of the inventive concepts, the neural network device may calculate a probability of being updated in the next image frame for each of a plurality of partial regions on the image frame based on the geometric movement of the object, and determine a partial region having a relatively high probability of being updated based on a preset reference probability.

Meanwhile, a partial region on the image frame may be projected on a partial region on a feature map. The neural network device may determine a partial region having a high probability of being updated in a current feature map by projecting a partial region having a high probability of being updated on the image frame onto the feature map. By doing so, the neural network device may predict a partial region to be updated when performing an operation on the next image frame in the current feature map.

Figure 13:
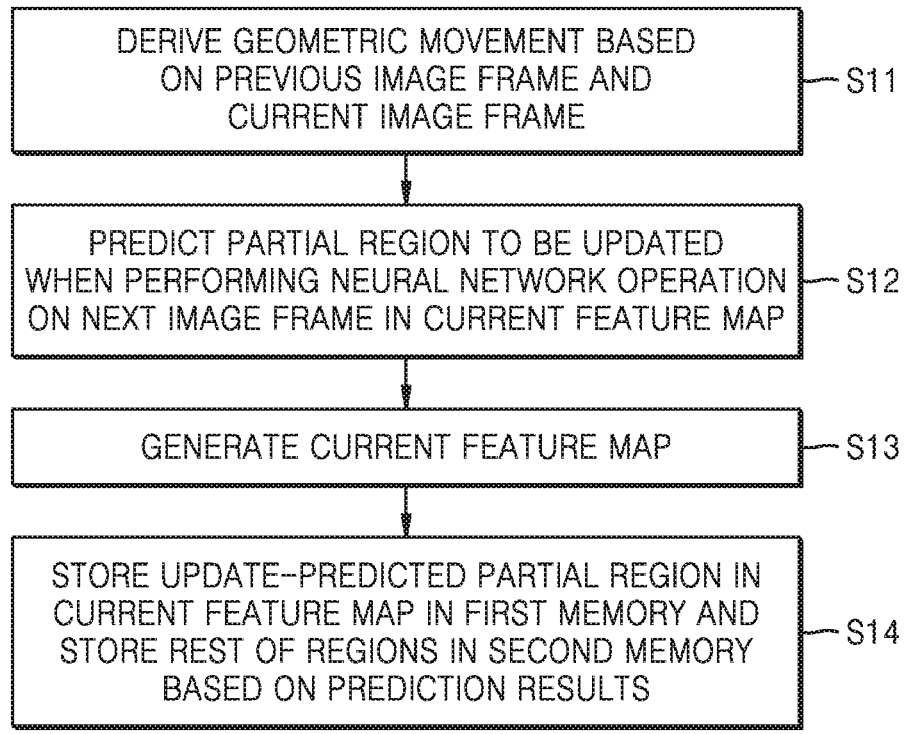
FIG. 13 is a flowchart for explaining an operation of a neural network device according to at least one example embodiment of the inventive concepts.

FIG. 13 is a flowchart for explaining an operation of a neural network device according to at least one example embodiment of the inventive concepts.

Referring to FIG. 13, when receiving a current image frame, the neural network device may derive a geometric movement based on a previous image frame and a current image frame (S11). As described with reference to FIGS. 12A and 12B, the neural network device may determine a geometric movement, that is, a geometric characteristic of an object included in image frames through various image tracking methods. According to at least one example embodiment of the inventive concepts, derivation of the geometric movement may be performed by other devices, for example, other computing devices. The neural network device may receive a derivation result from a different apparatus and operate based on it.

The neural network device may predict a partial region to be updated when performing a neural network operation on the next image frame among partial regions of a current feature map based on the geometric movement (S12). For example, the neural network device may predict a partial region to be updated by determining a region having a high probability of being updated among partial regions of the current feature map. As described above, the neural network device may predict a partial region to be updated on the current image frame, and predict a partial region to be updated on the feature map based on the update-predicted partial region on the current image frame.

After that, the neural network device may generate a current feature map (S13). For example, operation S13 may be performed according to the operating method described with reference to FIG. 10.

The neural network device may store, in the first memory, an update-predicted partial region, that is, a partial region having a high probability of being updated among partial regions of the current feature map, and store the rest of regions in the second memory based on a predicted result when storing the current feature map in the memory (S14). In this case, the first memory may be a memory having a relatively short distance from an operation circuit, for example, a processing circuit performing an operation based on the current feature map, and the second memory may be a memory having a relatively long distance from the operation circuit. Latency of the first memory may be shorter than latency of the second memory.

Figure 14:
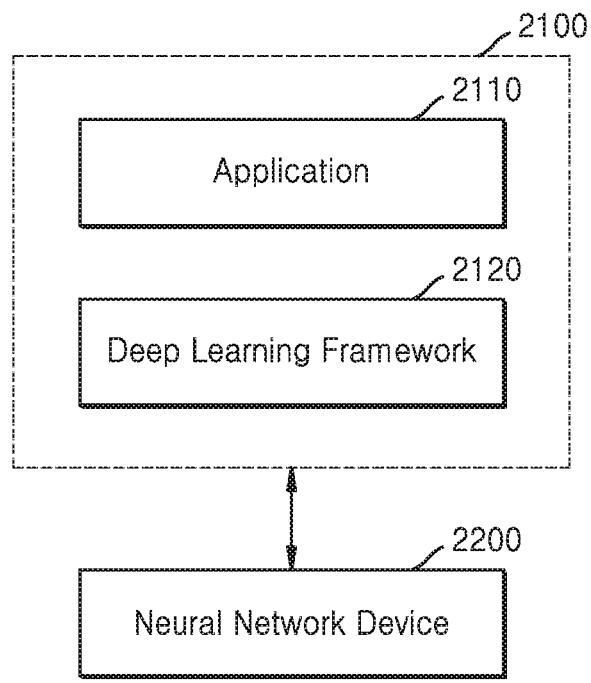
FIG. 14 is a block diagram of a neural network system according to at least one example embodiment of the inventive concepts.

FIG. 14 is a block diagram of a neural network system 2000 according to at least one example embodiment of the inventive concepts.

Referring to FIG. 14, the neural network system 2000 may include a software unit 2100 and a neural network device 2200 (that is, a hardware unit). The neural network device according to the above-described embodiments is applicable to the neural network system 2000.

The software unit 2100 may include an application 2110 and a deep learning framework 2120. The application 2110 and the deep learning framework 2120 may be programs, commands, instructions, etc., may be stored in the memory 14 (see FIG. 1), and executed by the CPU 11 or another processor.

The application 2110 may issue tasks to be performed through a neural network operation. For example, the application 2110 may request object recognition, image division, etc. of a received image frame. To perform tasks requested by the application 2110, the deep learning framework 2120 may provide a deep learning algorithm-based neural network model, and allocate a neural network operation to the neural network device 2200. The neural network device 2200 may perform a neural network operation allocated by the deep learning framework 2120.

According to at least one example embodiment of the inventive concepts, the neural network device 2200 may derive a geometric characteristic between received image frames, for example, a geometric movement of an object included in the image frames, and estimate an operation result (e.g. a final operation result of a neural network operation, or an output feature map of a layer group including a plurality of layers of a neural network) regarding a current image frame based on the geometric characteristic. Meanwhile, the estimation of the operation result may be performed by an apparatus other than the neural network device 2200, for example, another operation apparatus.

The deep learning framework 2120 may determine whether to perform a neural network operation on a current image frame based on an estimated operation result. Alternatively, the deep learning framework 2120 may determine whether to perform a neural network operation on a plurality of regions of the current image frame, and determine to perform a neural network operation on only partial regions among a plurality of regions of the current image frame based on an estimated operation result. The neural network device 2200 may perform a neural network operation on regions on which a neural network operation is determined to be performed among a plurality of regions of the current image frame.

Figure 15:
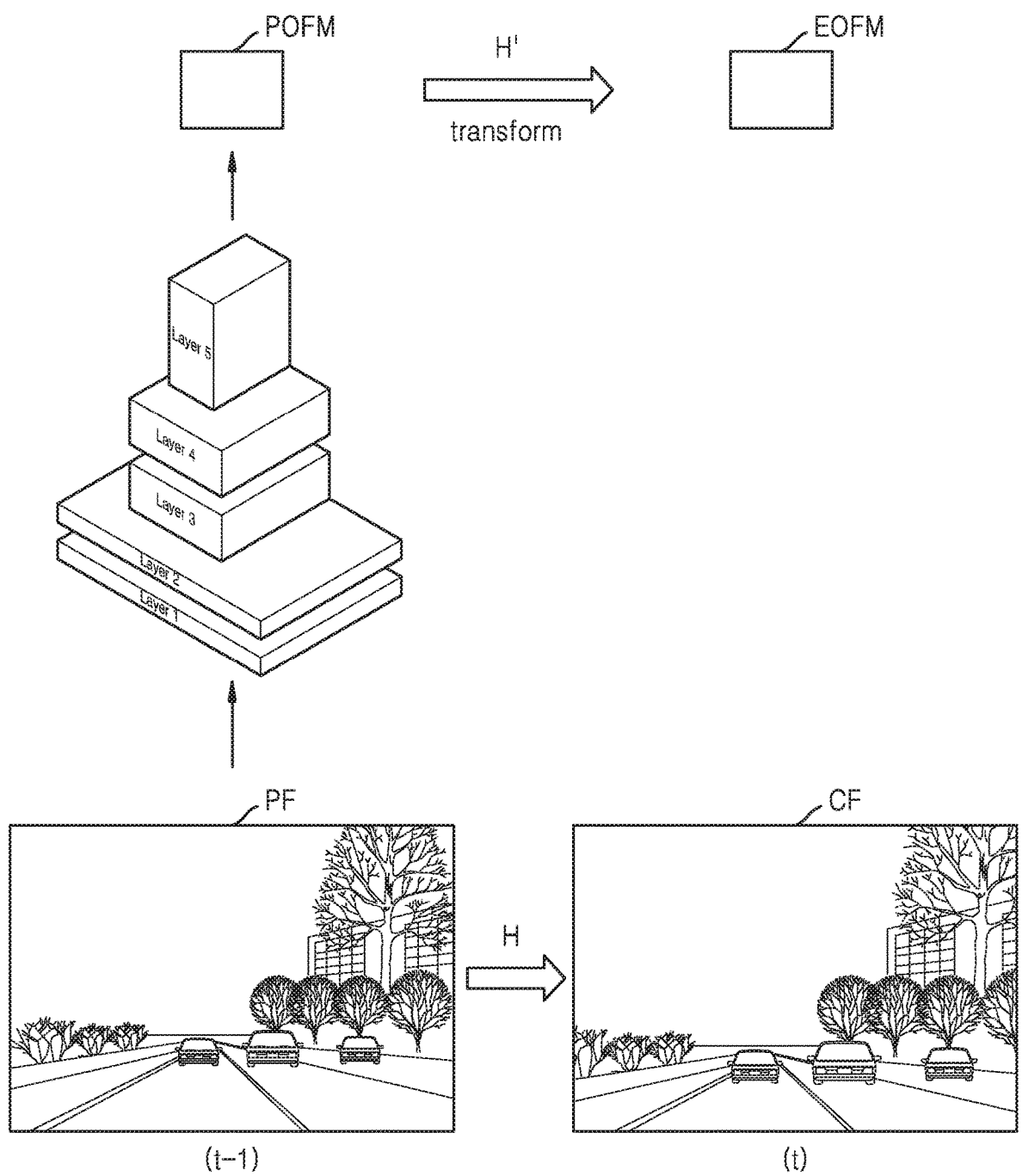
FIG. 15 is view for explaining a method of estimating an operation result of a current image frame in a neural network system, according to at least one example embodiment of the inventive concepts.

FIG. 15 is view for explaining a method of estimating an operation result of a current image frame in a neural network system according to at least one example embodiment of the inventive concepts.

The method of estimating an operation result of FIG. 15 may be performed by a neural network device. However, the estimation of the operation result is not limited thereto and may be performed by another operation apparatus.

The neural network device may calculate a conversion function H (e.g. a conversion function for affine conversion, etc.) representing a conversion relation between input image frames based on a geometric movement of an object included in the image frames. For example, in the case where conversion is performed on a previous image frame PF by using the conversion function H, the previous image frame PF may be converted to a current image frame CF.

A change between input image frames may appear as a change between operation results, for example, output feature maps. A conversion relation between the input image frames may be similar to a conversion relation between output feature maps. Therefore, a conversion function H' representing a conversion relation between output feature maps may be the same as or similar to a conversion function H. The neural network device may estimate a current output feature map EOFM by applying the conversion function H to a previous output feature map POFM and performing conversion.

Figure 16:
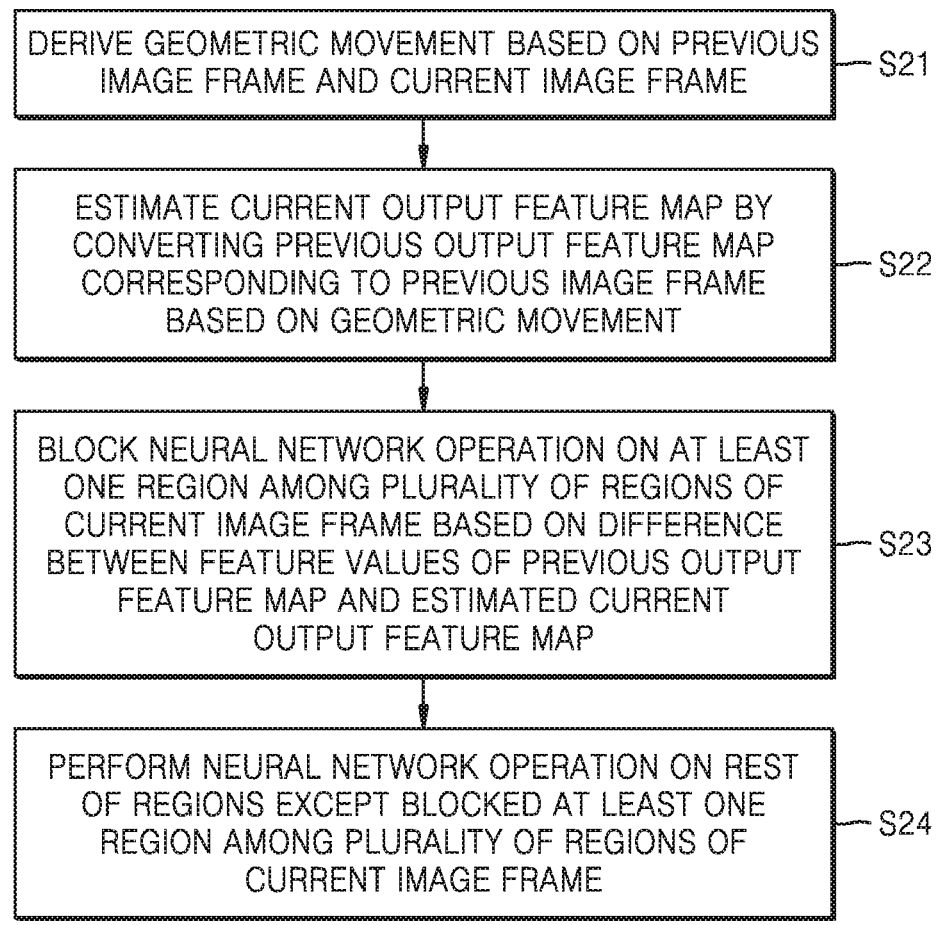
FIG. 16 is a flowchart of a method of operating a neural network system according to at least one example embodiment of the inventive concepts.

FIG. 16 is a flowchart of a method of operating a neural network system, according to at least one example embodiment of the inventive concepts.

Referring to FIG. 16, the neural network system may derive a geometric movement based on a previous image frame and a current image frame (S21). As described with reference to FIGS. 12A and 12B, the neural network system may derive a geometric movement based on received image frames, for example, the geometric movement of an object included in the image frames.

The neural network system may estimate an output feature map EOFM corresponding to a current image frame CF by converting a previous output feature map POFM corresponding to a previous image frame PF based on the geometric movement (S22). As described with reference to FIG. 15, the neural network system may calculate a conversion function (e.g. a conversion function for affine conversion, etc.) based on the geometric movement derived in operation S21, and estimate a current output feature map EOFM by converting a previous output feature map POFM based on the conversion function H.

The neural network system may block a neural network operation of at least one region among a plurality of regions of the current image frame CF based on a difference between the previous output feature map POFM and the estimated current output feature map EOFM, for example, a difference between feature values (S23). For example, the neural network system may not perform a neural network operation if a difference between the previous output feature map POFM and the estimated current output feature map EOFM is a preset reference value or less. According to at least one example embodiment of the inventive concepts, if a difference between the previous output feature map POFM and the estimated current output feature map EOFM corresponding to partial regions among a plurality of regions of the current image frame CF, for example, a difference between feature values is less than the preset reference value, the neural network system may block a neural network operation of the partial regions.

The neural network system may perform a neural network operation on the rest of regions except blocked at least one region among a plurality of regions of the current image frame CF (S24). Performing of a neural network operation on the rest of regions, and a memory access during a process of performing the operation may be performed according to the method described with reference to FIGS. 8 to 11.

For example, the deep learning framework 212 (see FIG. 14) may mask partial regions in which a difference between the previous output feature map POFM and the estimated current output feature map EOFM is the preset reference value or less among a plurality of regions of the current image frame CF, and may not perform an operation on the partial regions. The deep learning framework 212 may allocate, to the neural network device, a neural network operation on the rest of regions except the masked region among the plurality of regions of the current image frame CF. The neural network device may perform a neural network operation on the allocated regions.

As described above, the neural network system according to at least one example embodiment of the inventive concepts may estimate a current output feature map EOFM based on a relation between a previous image frame PF and a current input image frame CF, and if a difference between the estimated current output feature map EOFM and a previous output feature map POFM is less than a preset reference value, may reduce an amount of operations by omitting a neural network operation.

According to the method of operating the neural network device according to various embodiments, since the neural network device stores intermediate operation results regarding a previous image frame in the memory and efficiently performs an operation by reusing the intermediate operation results when performing an operation on a current image frame, an amount of operations of the neural network operation may be reduced. The neural network device may selectively read only features to be updated in a feature map from the memory in reusing the feature map stored in the memory, or may store, in a buffer or a memory relatively close to an operation circuit, features having a high possibility of being updated when performing an operation on the next image frame among a feature map generated with respect to a current image frame. Therefore, memory transaction and consumed time corresponding to the memory transaction may be reduced. Also, since the neural network device estimates an operation result regarding a current frame, and when a change between an operation result regarding a previous frame and an operation result regarding the estimated operation result regarding the current frame is small, blocks (or skips) to perform an operation on the current frame or an operation on a partial region of the current frame, an amount of operations of a neural network operation and memory transaction may be reduced. Therefore, an operating speed of the neural network device and an electronic system on which the neural network device is mounted may be improved and power consumption thereof may be reduced.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a neural network device configured to perform a neural network operation on successively input image frames, the method comprising:
   performing, by a processing circuit, a linear operation of a neural network on a first delta feature map to generate a second delta feature map, the first delta feature map is generated based on a difference between a current image frame and a previous image frame;
   loading feature values as a first previous feature map onto the processing circuit from at least one memory, the loaded feature values being feature values corresponding to a first partial region to be updated in a first feature map stored in the at least one memory;
   generating, by the processing circuit, a first current feature map based on the second delta feature map and the first previous feature map;
   generating, by the processing circuit, a third delta feature map by performing a non-linear operation on the first previous feature map and the first current feature map; and
   updating the first feature map by storing the first current feature map in the at least one memory.

2. The method of claim 1, further comprising:
   determining the first partial region in the first feature map based on delta feature values of the second delta feature map.

3. The method of claim 2, wherein the determining of the first partial region to be updated comprises:
   determining, as the first partial region, a region of the first feature map corresponding to locations of delta features having delta feature values of a threshold value or more in the second delta feature map.

4. The method of claim 2, wherein the determining of the first partial region to be updated comprises:
   determining, from among a plurality of regions of the second delta feature map, at least one valid region, the at least one valid region including a reference number or more of delta feature values that are equal to or greater than a threshold value; and
   determining, as the first partial region, at least one region corresponding to the at least one valid region among a plurality of regions of the first feature map.

5. The method of claim 1, further comprising:
   deriving a geometric movement of an object on an image based on a previous image frame and a current image frame.

6. The method of claim 5, further comprising:
   predicting a second partial region to be updated when performing the neural network operation on a next image frame in the first current feature map based on the geometric movement,
   wherein the updating of the first feature map includes
      storing the second partial region in the first current feature map in a first memory based on the predicted second partial region, and
      storing rest of the regions except for the predicted second partial region in the first current feature map in a second memory.

7. The method of claim 6, wherein access latency of the first memory is shorter than access latency of the second memory.

8. The method of claim 6, wherein the first memory is an internal memory, and the second memory is an external memory.

9. The method of claim 5, further comprising:
determining a conversion function representing a conversion relation between the previous image frame and the current image frame based on the geometric movement; and
estimating an output feature map regarding the current image frame by converting, based on the conversion function, a previous output feature map generated when performing the neural network operation on the previous image frame,
wherein the first delta feature map corresponds to a region, from among a plurality of regions of the current image frame, in which a difference between feature values of a previous output feature map and feature values of the estimated output feature map is equal to or greater than a reference value.

10. A method of operating an application processor configured to perform a neural network operation, the method comprising:
performing, by a computing module, a linear operation of a neural network on a delta feature map to generate a linear delta feature map, the delta feature map is generated based on a difference between a previous input frame and a current input frame;
loading, from at least one of a first memory and a second memory, first feature values onto a processing circuit of the computing module,
the first feature values being included in at least one first block,
the at least one first block being a block, from among a plurality of blocks of a previous feature map stored in the at least one of the first memory and the second memory, that corresponds to valid blocks of the linear delta feature map;
generating, by the computing module, a current feature map by summing each of delta feature values included in the valid blocks of the linear delta feature map and a corresponding feature value among the first feature values;
performing, by the computing module, a non-linear operation of the neural network on the current feature map and the first feature values to generate a third delta feature map; and
updating, by the computing module, the previous feature map based on the current feature map.

11. The method of claim 10, wherein each of the valid blocks includes a non-zero delta feature value.

12. The method of claim 10, wherein the updating of the previous feature map comprises:
storing, in the first memory, at least one second block, from among a plurality of blocks of the current feature map, that is determined to have a relatively high probability of being updated when performing the neural network operation on a next input frame; and
storing, in the second memory, the blocks other than the at least one second block among the plurality of blocks of the current feature map,
wherein access latency of the first memory is shorter than access latency of the second memory.

13. The method of claim 12, wherein the first memory includes an internal memory of the computing module, and the second memory includes an external memory of the computing module.

14. The method of claim 12, wherein a probability that the second block is updated is determined based on a geometric movement derived based on the previous input frame and the current input frame.

15. The method of claim 10, further comprising:
estimating a geometric movement based on the previous input frame and the current input frame;
estimating a current output feature map by converting a previous output feature map regarding the previous input frame based on the estimated geometric movement; and
blocking the neural network operation on at least one region among a plurality of regions of the current input frame based on the previous output feature map and the estimated current output feature map.

16. A computing device configured to perform a neural network operation on successively received input frames, the computing device comprising:
a processing circuit configured to,
perform a linear operation of a neural network on a first delta feature map to generate a second delta feature map, the first delta feature map generated based on a difference between a current image frame and a previous image frame,
generate a first current feature map based on a first previous feature map and the second delta feature map, and
perform a non-linear operation of the neural network on the first previous feature map and the first current feature map to generate a third delta feature map; and
a memory configured to store the first previous feature map,
wherein the computing device is configured to provide, to the processing circuit, feature values of a first partial region to be updated in the first previous feature map from the memory.

17. The device of claim 16, further comprising:
a controller configured to determine the first partial region based on delta feature values of the second delta feature map.

18. The device of claim 17, wherein,
the controller is configured to determine, in advance, a second partial region whose update is predicted in the first current feature map based on a geometric characteristic between the input frames, and
the processing circuit is configured to,
store the second partial region in the first current feature map in a first memory, and
store, in a second memory, regions of the first current feature map other than the second partial region, the first memory requiring less time for the processing circuit to access than the second memory.

19. The device of claim 16, wherein the processing circuit is configured to:
generate a second previous feature map and a second current feature map by performing a non-linear operation on the first previous feature map and the first current feature map; and
generate the third delta feature map based on a difference between feature values of the second previous feature map and the second current feature map.

* * * * *